(12) United States Patent
Wada et al.

(10) Patent No.: US 9,418,463 B2
(45) Date of Patent: *Aug. 16, 2016

(54) MOBILE COMMUNICATION DEVICE

(71) Applicant: KYOCERA CORPORATION, Kyoto (JP)

(72) Inventors: Takaaki Wada, Kyotanabe (JP); Takahiro Sato, Daito (JP); Yuichi Taneya, Osaka (JP); Kuniyasu Koizumi, Ritto (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,834

(22) Filed: Nov. 17, 2015

(65) Prior Publication Data

US 2016/0071299 A1 Mar. 10, 2016

Related U.S. Application Data

(63) Continuation of application No. 14/038,227, filed on Sep. 26, 2013, now Pat. No. 9,276,891, which is a continuation of application No. 10/580,318, filed as application No. PCT/JP2004/017607 on Nov. 26, 2004, now abandoned.

(30) Foreign Application Priority Data

Nov. 27, 2003 (JP) .................................. 2003-397659

(51) Int. Cl.
 *G06T 11/60* (2006.01)
 *H04L 12/66* (2006.01)
 (Continued)

(52) U.S. Cl.
 CPC ............... *G06T 11/60* (2013.01); *G06T 11/001* (2013.01); *H04L 12/66* (2013.01); *H04L 51/28* (2013.01);
 (Continued)

(58) Field of Classification Search
 CPC ... H04M 1/576; H04M 1/72547; H04L 51/28
 USPC ........... 455/550.1, 556, 567, 556.1, 466, 415, 455/414.1, 90.14; 379/142.06, 142.09; 345/636, 629, 864, 744, 690, 589
 See application file for complete search history.

(56) References Cited

U.S. PATENT DOCUMENTS 6,704,027 B2 * 3/2004 Nakano .................... G09G 5/00
 345/629
7,084,885 B2 8/2006 Okada et al.
 (Continued)

FOREIGN PATENT DOCUMENTS

| CN | 1578331 A | 2/2005 |
|---|---|---|
| CN | 1585538 A | 2/2005 |

(Continued)

OTHER PUBLICATIONS

Kinshita, "Mac OS X and the Internet," *Mac Fan Internet*, published by Mainichi Communications, Inc. on Dec. 1, 2000, Japan, 5(12):54-55.

(Continued)

*Primary Examiner* — Ping Hsieh
(74) *Attorney, Agent, or Firm* — Duane Morris LLP

(57) ABSTRACT

A mobile communication device that includes: a storage unit configured to store therein image data; an address book storage unit configured to store therein communication party information associated with the image data; and an output control unit configured to display, when a sent mail that is transmitted by the mobile communication device is selected by selection of transmission destination information that corresponds to the sent mail, image data together with the transmission destination information, wherein the transmission destination information comprises communication party information pertaining to the sent mail, the image data being associated with the transmission destination information such that the image data is displayed together with the transmission destination information upon selection of the transmission destination information, and wherein the image data was previously stored in the storage unit and not attached to the sent mail when it was sent.

18 Claims, 12 Drawing Sheets

(51) Int. Cl.
*H04M 1/57* (2006.01)
*H04M 1/725* (2006.01)
*H04L 12/58* (2006.01)
*G06T 11/00* (2006.01)

(52) U.S. Cl.
CPC .......... *H04M 1/576* (2013.01); *H04M 1/72547* (2013.01); *H04M 1/72552* (2013.01); *H04M 1/72558* (2013.01)

(56) References Cited

U.S. PATENT DOCUMENTS

| | | | | |
|---|---|---|---|---|
| 7,295,213 | B2 * | 11/2007 | Kim | G09G 3/2003 345/589 |
| 7,308,277 | B2 | 12/2007 | Yomoda | |
| 2002/0039095 | A1 | 4/2002 | Nakano | |
| 2002/0094806 | A1 * | 7/2002 | Kamimura | H04M 1/576 455/415 |
| 2003/0110227 | A1 * | 6/2003 | O'Hagan | G06Q 10/107 709/206 |
| 2006/0121850 | A1 * | 6/2006 | Hama | H04M 1/72555 455/41.2 |

FOREIGN PATENT DOCUMENTS

| | | |
|---|---|---|
| EP | 1182639 A2 | 2/2002 |
| EP | 1349407 A2 | 10/2003 |
| JP | 04-249297 | 9/1992 |
| JP | 5-204795 | 8/1993 |
| JP | 7-66832 | 3/1995 |
| JP | 11-175441 | 7/1999 |
| JP | 2001-296828 A | 10/2001 |
| JP | 2002-132663 | 5/2002 |
| JP | 2002-132664 A | 5/2002 |
| JP | 2002-140265 | 5/2002 |
| JP | 2002-176679 | 6/2002 |
| JP | 2003-157224 A | 5/2003 |
| JP | 2003-224634 A | 8/2003 |

OTHER PUBLICATIONS

International Search Report mailed Apr. 5, 2005, of International Application No. PCT/JP2004/017607.
Notification of Reasons for Refusal (translation), mailed Jun. 22, 2010, from Japanese Patent Application No. 2005-515820, 4 pages.
Office Action issued on Mar. 12, 2013, in corresponding Japanese Patent Application No. 2010-177165, filed with Statement of Relevance, 4 pages total.
Office Action issued on Nov. 19, 2013, in corresponding Japanese Patent Application No. 2010-177165, filed with Statement of Relevance, 5 pages total.

* cited by examiner

| No. | | 001 |
|---|---|---|
| | NAME | TARO YAMADA |
| | TELEPHONE NUMBER | 09012345678 |
| | MAIL ADDRESS | yama@abc.ne.jp |
| | IMAGE | yama.jpg |
| | MUSIC | yama-bgm |
| | . . . | . . . |
| | . . . | . . . |

303

| USER DATA | PRESET DATA |
|---|---|
| IMAGE | IMAGE |
| yama.jpg | default.jpg |
| xyz.jpg | yyy.jpg |
| . . . | . . . |
| . . . | . . . |
| MUSIC | MUSIC |
| yama-bgm | default |
| abc | xxx |
| . . . | . . . |
| . . . | . . . |

304

| USER DATA | PRESET DATA |
|---|---|
| yama-bgm | default |
| yama.jpg | yyy.jpg |
| xyz.jpg | . |

| INBOX | | 402 |
|---|---|---|

| No. | 001 |
|---|---|
| NAME | TARO YAMADA |
| SENDER MAIL ADDRESS | yama@abc.ne.jp |
| DATE AND TIME OF RECEIPT | 03.12.3  11:20 |
| SUBJECT | HELLO |
| MESSAGE | HELLO! HOW ARE YOU DOING? ...... |

OUTBOX — 403

| No. | 001 |
|---|---|
| NAME | HANADA |
| DESTINATION MAIL ADDRESS | hana@abc.def |
| DATE AND TIME OF TRANSMISSION | 03.12.1  10:10 |
| SUBJECT | MATTER IN QUESTION |
| MESSAGE | HOW ARE YOU MAKING OUT WITH IT SINCE THEN? ...... |

| MANAGEMENT TABLE (SET BY USER) | |
|---|---|
| RECEPTION/DISPLAY SETTINGS | |
| AUTOMATIC MAIL RECEPTION | ON |
| .... | ... |
| BACKGROUND IMAGE | ON |
| BACKGROUND MUSIC | ON |
| .... | ... |
| TRANSMISSION/CREATION SETTINGS | |
| RETURN ADDRESS | ... |
| SIGNATURE | ON |
| .... | ... |
| OTHER SETTINGS | |
| .... | ... |
| .... | ... |

FIG. 5
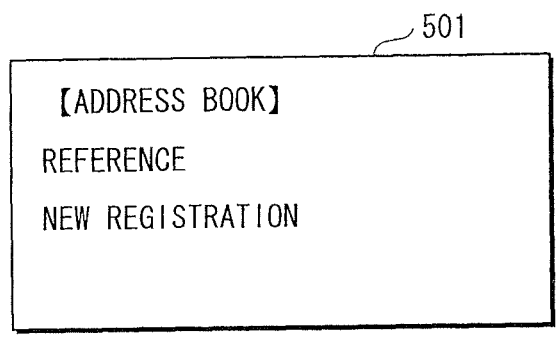
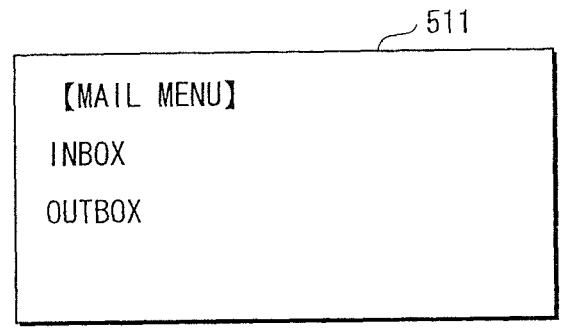

FIG. 6

601
[ADDRESS BOOK NEW REGISTRATION]
[NAME]    <BLANK>
[TELEPHONE NUMBER]    <BLANK>
[MAIL ADDRESS]    <BLANK>
    <BLANK>
[MUSIC]    <BLANK>
...

602
【IMAGE】
◇USER DATA◇
  yama.jpg
  xyz.jpg
  ...
◇PRESET DATA◇
  default.jpg
  yyy.jpg
  ...

603
【MUSIC】
◇USER DATA◇
  yama-bgm
  abc
  ...
◇PRESET DATA◇
  default
  xxx
  ...

[ADDRESS BOOK]　No. 000
[NAME]　　TARO YAMADA
[TELEPHONE NUMBER]　　09012345678
[MAIL ADDRESS]　　yama@abc.ne.jp
　　yama.jpg
[MUSIC]　　yama-bgm
　...

FIG. 8
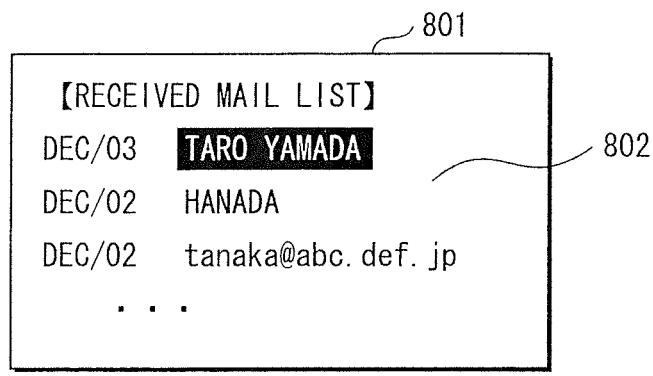
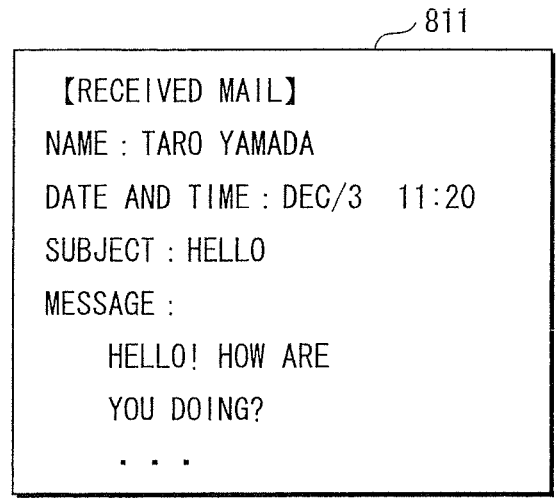

MOBILE COMMUNICATION DEVICE

RELATED APPLICATIONS

This application is a continuation of U.S. application Ser. No. 14/038,227, filed on Sep. 26, 2013, which is a continuation of U.S. application Ser. No. 10/580,318 filed on Mar. 23, 2007, which is a National Phase application of International Application No. PCT/JP04/17607, filed on Nov. 26, 2004, which claims priority to Japanese Application No. 2003-397659, filed on Nov. 27, 2003, the entireties of which are incorporated by reference herein.

BACKGROUND OF THE INVENTION

1. Field of the Invention

The present invention relates to a mobile communication device, in particular to technology for displaying emails on a cell phone.

2. Description of the Related Art

The recent cell phones are equipped with functions of, if a telephone number, ring alert and an image have been registered to the address book under the name of a caller, sounding the registered ring alert and displaying the image—e.g. a picture of the caller's face—when a call from the caller is incoming. Herewith, the users are able to identify callers before answering the phone.

Being called regardless of time and place is unpleasant; with emails (hereinafter, referred to simply as "mails"), the recipients can read them at their convenience. In addition, mails are generally more cost efficient for the senders, as compared to telephone calls. As a result, these days cell phones are increasingly used to make mail communication rather than to have telephone communication.

In response to this trend, a technology has been disclosed in which an image having been registered in accordance with the mail address of a sender is displayed when a mail from the sender is incoming, as in the case of when a call is incoming (Patent Reference 1).

<Patent Reference 1>Japanese Laid-Open Patent Application Publication No. 2002-176679

SUMMARY OF THE INVENTION

With the above-mentioned technology, the user is able to identify senders at the receipt of mails; however, the memory fades away with time, and it is sometimes the case that the user has trouble not being able to recall or identify the sender when selecting a received mail from the received mail list or when opening a mail and reading the mail message.

In view of the above issue, the present invention aims at offering a cell phone enabling the user to recall and identify the sender at the time of selecting or opening a mail.

In order to solve the above problem, the mobile communication device of the present invention comprises: a storage unit operable to store therein image data; an address book storage unit operable to store therein communication party information, which indicates a party for mail communication, the communication party information being associated with the image data; and an output control unit operable to display, when the communication party information is specified, the associated image data together with the specified communication party information.

According to the above structure, if communication party information of the mail has been stored, in association with image data, in the address book storage unit, the associated image data is displayed together with the communication party information when the communication party information of the mail is specified. As a result, the user is able to recall or identify the sender of the mail.

In order to solve the above problem, the mobile communication device of the present invention comprises: a storage unit operable to store therein image data; an address book storage unit operable to store therein communication party information, which indicates a communication party of a mail, the communication party information being associated with the image data; and an output control unit operable to display, when the mail is specified, the associated image data together with a message of the specified mail.

According to the above structure, if communication party information of the mail has been stored, in association with image data, in the address book storage unit, the associated image data is displayed together with the communication party information when a message of the specified mail is displayed. As a result, the user is able to recall or identify the sender of the mail.

In addition, the output control unit includes: an image synthesizing subunit operable to form a synthesized image by synthesizing the associated image data and the message; and a synthesized image display subunit operable to display the synthesized image.

Herewith, the image data and message of the mail are displayed in a synthesized fashion, and the user is able to see the image data together with the message.

In addition, the image synthesizing subunit forms an image by performing, on the associated image data, brightness enhancement in which brightness of each pixel of the associated image data is brought close to maximum brightness, and forms the synthesized image by using the formed image as a background image, on top of which the message in black text is laid.

Herewith, the sender's image having less variation in brightness is displayed as a bright background image while the message being displayed in black text. Thus, these two have enhanced contrast when synthesized, and therefore easily viewable message can be displayed.

In addition, in the brightness enhancement, a brightness scale of each pixel of the associated image data is changed to a value calculated from (m+n)/2, where m is a maximum brightness scale and n is the brightness scale of the pixel.

Herewith, even the darkest pixels in the sender's image are brightly displayed with half the maximum brightness. According to the brightness of each pixel of the original image, the sender's image is displayed as a background image brighter than the original image, and therefore easily viewable image and message can be displayed.

In addition, the image synthesizing subunit forms an image by performing, on the associated image data, brightness reduction in which brightness of each pixel of the associated image data is brought close to minimum brightness, and forms the synthesized image by using the formed image as a background image, on top of which the message in white text is laid.

Herewith, the sender's image having less variation in brightness is displayed as a dark background image while the message being displayed in white text. Thus, these two have enhanced contrast when synthesized, and easily viewable image and image can be displayed for the user.

In addition, the storage unit includes a music data storage subunit operable to store therein music data. Here, the communication party information stored in the address book storage unit is associated with the music data. The output control unit includes a music output subunit operable to output, when the message of the specified mail is displayed, the associated music data.

Herewith, if the communication party information of the mail has been stored, in association with music data, in the address book storage unit, the music of the music data is also output when the message of the mail with the mail address is displayed. As a result, the user is able to recall or identify the sender by the music associated with the sender.

In addition, the output control unit includes: an image synthesizing subunit operable to form a synthesized image for a mail list display by synthesizing a mail list and the associated image data when the mail is selected in the mail list; and a synthesized image display subunit operable to display the synthesized image.

Herewith, when the mail list is displayed, the user is always able to see the image of the sender of the selected mail, appearing as the background of the mail list.

In addition, the communication party information includes a mail address of the communication party. Here, the output control unit displays the image data associated with the communication party information including the mail address together with the message of the specified mail.

Herewith, the user is able to identify the communication party information in the address book storage unit, using the mail address, and also identify the image data associated with the communication party information.

In order to solve the above problem, the control method of the mobile communication device of the present invention is a control method of a mobile communication device including a storage unit operable to store therein image data and an address book storage unit operable to store therein communication party information, which indicates a party for mail communication. Here, the communication party information is associated with the image data. The control method comprises the steps of: when the communication party information is specified, reading from the storage unit the associated image data; and displaying the read image data together with the specified communication party information.

According to the above control method, if communication party information of the mail has been stored, in association with image data, in the address book storage unit, the associated image data is displayed together with the communication party information when the communication party information of the mail is specified. As a result, the user is able to recall or identify the sender of the mail.

In order to solve the above problem, the control method of the mobile communication device of the present invention is a mobile communication device including a storage unit operable to store therein image data and an address book storage unit operable to store therein communication party information, which indicates a communication party of a mail. Here, the communication party information is associated with the image data. The control method comprises the steps of: when the mail is specified, reading from the storage unit the associated image data; and displaying the read image data together with a message of the specified mail.

According to the above control method, if communication party information of the mail has been stored, in association with image data, in the address book storage unit, the associated image data is displayed together with the communication party information when a message of the specified mail is displayed. As a result, the user is able to recall or identify the sender of the mail.

BRIEF DESCRIPTION OF THE DRAWINGS

FIG. 3 shows an address book and the like of an information storage unit according to the preferred embodiment;

FIG. 4 shows mail-related data of the information storage unit according to the preferred embodiment;

FIG. 5 shows the address book and an example of a mail menu of the preferred embodiment;

FIG. 6 shows an example of registration screens for making registration to the address book according to the preferred embodiment;

FIG. 7 shows an example of a result of the registration to the address book according to the preferred embodiment;

FIG. 8 is a display example of a received mail list according to the preferred embodiment;

Figure 1:
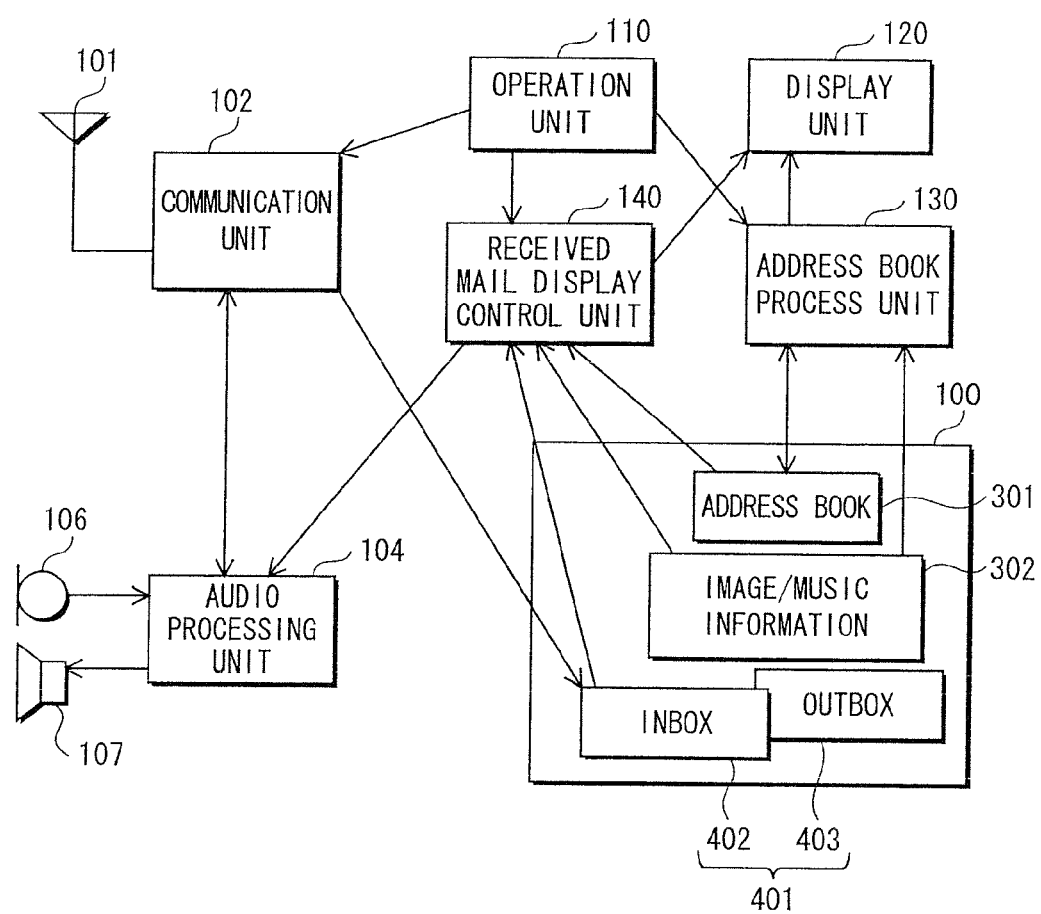
FIG. 1 is a block diagram of a preferred embodiment of a cell phone according to the present invention.

EXPLANATION OF REFERENCES 101 antenna
102 communication unit
104 audio processing unit
106 microphone (telephone transmitter)
107 speaker (telephone receiver)
100 information storage unit
110 operation unit
111 address book menu button
112 mail menu button
115 OK button
116 UP button
117 DOWN button
120 display unit
130 address book process unit
140 received mail display control unit
301 address book
302 image/music information
303 image/music data ID information
304 image/music data file
401 mailbox
402 inbox
403 outbox
404 mail management table
501 address book menu
511 mail menu
601 new registration
602 image data ID information list
603 music data ID information list
701 address book registration example
801 received mail list
811 received mail display example

DETAILED DESCRIPTION OF THE EXEMPLARY EMBODIMENTS

Next is described a preferred embodiment of a mobile communication device, a cell phone, according to the present invention.

FIG. 1 is a block diagram of the cell phone, a mobile communication device of the present embodiment. This cell phone comprises: an antenna 101; a communication unit 102; an audio processing unit 104; a microphone 106; a speaker 107; an information storage unit 100; an operation unit 110; a display unit 120; an address book process unit 130; and a received mail display control unit 140.

Figure 2:
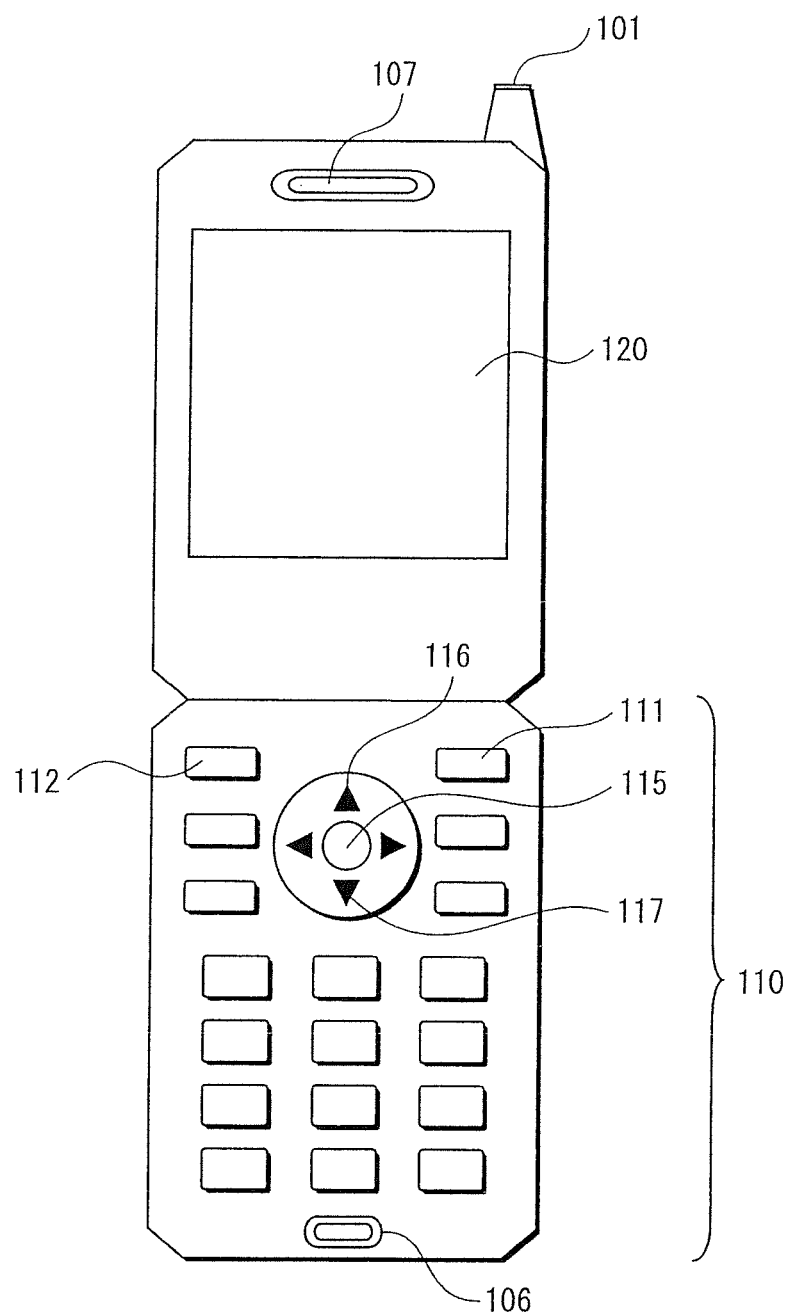
FIG. 2 shows front and back faces of the cell phone according to the preferred embodiment.

FIG. 2 shows a front side of the folding camera cell phone of the present embodiment open. Some of the components with reference numerals in FIG. 2 correspond to components having the same reference numerals in FIG. 1.

The antenna 101 receives from a communication base station (not shown) electric waves of modulated signals, such as voice of the calling party and incoming mails, and transmits the modulated signals to the communication unit 102. The antenna 101 also conducts operations in the reverse direction, transmitting to the communication base station electric waves of modulated signals, such as voice of the called party and outgoing mails received from the communication unit 102.

The communication unit 102 demodulates the modulated signals received from the antenna 101 to signals of the voice of the calling party, incoming mails or the like. While the voice is output to the audio processing unit 104, the mails are recorded in an inbox 402 of the information storage unit 100. Also the communication unit 102, reversely, transmits to the antenna 101 modulated signals of the voice of the called party, outgoing mails or the like.

The audio processing unit 104 outputs to the speaker 107 audio signals received from the communication unit 102 or the received mail display control unit 140. The audio processing unit 104 also transmits to the communication unit 102 voice of the called party received from the microphone 106.

The information storage unit 100 is realized using RAM (Random Access Memory) and ROM (Read Only Memory), and stores therein a variety of information—for example, an address book 301, image/music information 302, a mailbox 401 including an inbox 402 and an outbox 403, and a menu.

FIG. 3 shows an example of the address book 301 and image/music information 302.

Contained in the address book 301 is information of communication parties for telephone or mail communications, and items for each entry include name, telephone number, mail address, image data identifier, and music data identifier. Registration to the address book 301 is performed by the user through button operations on the operation unit 110, and the address book 301 is referred to by the address book process unit 130 and received mail display control unit 140.

The image/music information 302 is information related to image and music data, and includes image/music data ID information 303 and image/music data files 304. The image/music data ID information 303 is composed of ID information of image data and music data, which are referred to by the received mail display control unit 140 and output to the display unit 120 or the like.

The image/music data files 304 are made up of image data file group and a music data file group, and each file has a file name.

Here, ID information of image data is image data identifier—specifically speaking, a file name of image data file. In a similar fashion, ID information of music data is a music data identifier—specifically speaking, a file name of a music data file.

Each of the image data and music data of the image/music information 302 is either user data created by the user or preset data incorporated in the cell phone from the beginning. The user data is stored in the RAM while the preset data being stored in the ROM. Note here that data formatted in content description languages for portable devices—for example, HDML (Handheld Device Markup Language)—an be applicable as the image data and music data.

FIG. 4 shows an example of a data structure of the mailbox 401. The mailbox 401 includes the inbox 402, the outbox 403 and a mail management table 404.

Stored in the inbox 402 are received mails 412, which are managed in order of the latest date and time of receipt. The outbox 403 also stores therein sent mails 413, which are managed in order of the latest date and time of transmission.

Each of the received mails 412 includes information items of sender name, mail address, date and time of receipt, subject and message, which are referred to by the received mail display control unit 140 and output to the display unit 120 or the like. On the other hand, each of the sent mails 413 includes items of destination name, mail address, date and time of transmission, subject and message.

The mail management table 404 stores therein settings of control conditions for the time when mails are displayed or transmitted/received. The settings can be changed via the operation unit 110. The control conditions managed in the mail management table 404 include ON/OFF settings for a background image and background music in relation to the reception/display settings.

In the case of the background image setting being ON, if the mail address of a received mail 412 has been registered to the address book 301 and also an image for the mail address has been registered thereto, the image is displayed as a background image when the message of the received mail 412 is displayed. If the background image setting is OFF, the background image is not displayed.

Much the same is true of the background music setting. When the background music setting is ON, if the mail address of a received mail 412 has been registered to the address book 301 and also music for the mail address has been registered thereto, the music is output as background music (BGM) when the message of the received mail 412 is displayed.

FIG. 5 shows an address book menu 501 and a mail menu 511 stored in the information storage unit 100. The information storage unit 100 stores these menus in the ROM.

The operation unit 110 receives various operations from the user. User operations include transmission and receipt of calls, registration to the address book 301 and mail reading.

FIG. 2 shows a layout of various buttons of the operation unit 110. Buttons of the operation unit 110 are, for example, an address book menu button 111, a mail menu button 112, an OK button 115, an UP button 116, a DOWN button 117, and number buttons from 0 to 9.

The display unit 120 is made up of a main display and a sub-display, which are realized for instance with a liquid crystal panel. The main display is used for normal operations of the cell phone, such as function settings and mail display. On the other hand, the sub-display is used for display of simple information—for example, display of messages for incoming calls and mails. An expression "display on the display unit 120" hereinafter indicates display on the main display.

The address book process unit 130 deals with registration and reference to the address book that stores therein information pertaining to communication parties.

Registration of a new communication party to the address book is started by the user pushing down the address book menu button 111. When the address book menu button 111 is pushed, the address book process unit 130 displays the address book menu 501 on the display unit 120. The term "display" hereinafter indicates "display on the display unit 120".

Menu items appearing on the address book menu 501 are "reference" and "new registration". Initially, the item of "reference" is highlighted (not shown) as an option. If the user pushes the DOWN button 117, "reference" changes to the normal display and the second item "new registration" is highlighted.

FIG. 6 illustrates an example for making a new registration to the address book.

If the user pushes the OK button 115 to confirm the selection of "new registration", the address book process unit 130 displays a new registration screen 601. Entry items on the new registration screen 601 include communication party name, telephone number, mail address, image and music. The name entry field is initially highlighted as an input option. Here, an input screen for "name" (not shown) is displayed when the user pushes the OK button 115. After inputting a name using appropriate buttons of the operation unit 110, the user returns to the new registration screen 601 by pushing the OK button 115 once again. At this point, the input name is displayed in the name entry field. The user inputs a telephone number and a mail address in a similar fashion, moving from one entry item to the other using the DOWN button 117.

Next, when the user pushes the OK button 115 in the entry field of "image", the address book process unit 130 reads image data ID information from the image/music data ID information 303 in the information storage unit 100 and displays it. Image data ID information list 602 is one example of such image data ID information. In this example, the ID information is image data identifiers. The image data ID information list 602 displays image data identifiers of the user data first, and then image data identifiers of the preset data.

The user highlights an appropriate image data identifier by operating the UP and DOWN buttons 116 and 117, and confirms the selection of the image data identifier by pushing the OK button 115. A name—"Close-up Shot of Mr. Yamada", for example—is given to image data at the creation and storage of the image data, and this name coupled with its data identifier may be stored in the image/music data ID information 303. Here, names of image data, instead of image data identifiers, may be displayed in the image data ID information list 602. In such a case, it is recommended to add an item of a data name to the image/music data ID information 303 and store the data name being coupled with a corresponding data file name.

Regarding registration of music, the user selects an appropriate music data identifier from the music data ID information list 603, as in the case of the image registration.

FIG. 7 shows an example for registering sender information to the address book 301. Here, the sender information means information of a mail sender.

The received mail display control unit 140 displays received mails. If the sender's mail address of a received mail and the sender's image and music data ID information have been registered, the received mail display control unit 140 also outputs an image of the image data file associated with the image data ID information at the display of the received mail, together with music of the music data file associated with the music data ID information.

Here, the image output is accomplished by displaying the image as a background image of the message. On the other hand, the music is output via the audio processing unit 104 during the display of the message.

The received mail display control unit 140 displays a mail menu in response to a user's push of the mail menu button 112. The mail menu 511 is one example of this.

When the user confirms the selection of "inbox" in the mail menu 511 with the OK button 115, the received mail display control unit 140 creates a received mail list 801 based on received mails in the inbox, and displays the listed mails in order of the latest date and time of receipt. Items displayed in the received mail list 801 include receipt date and sender name. Here, the sender name is a name associated with a mail address of the sender registered to the address book. If the name or the mail address of the sender is not found in the address book, the received mail display control unit 140 displays the mail address of the sender, instead of the name.

On the initial display of the received mail list 801, the received mail display control unit 140 highlights the top mail, assuming that it is selected. The received mail list 801 shown in FIG. 8 represents its initial display with the top mail selected.

In response to user's pushes of the UP and DOWN buttons 116 and 117, the received mail display control unit 140 moves across the selectable received mails, and highlights a selected mail in the received mail list.

When the OK button 115 is pushed, the received mail display control unit 140 opens the currently selected mail in the received mail list 801—for example, a mail from Mr. Taro Yamada 802, and sequentially displays the mail's sender name, date and time of receipt, subject and message.

Figure 9:
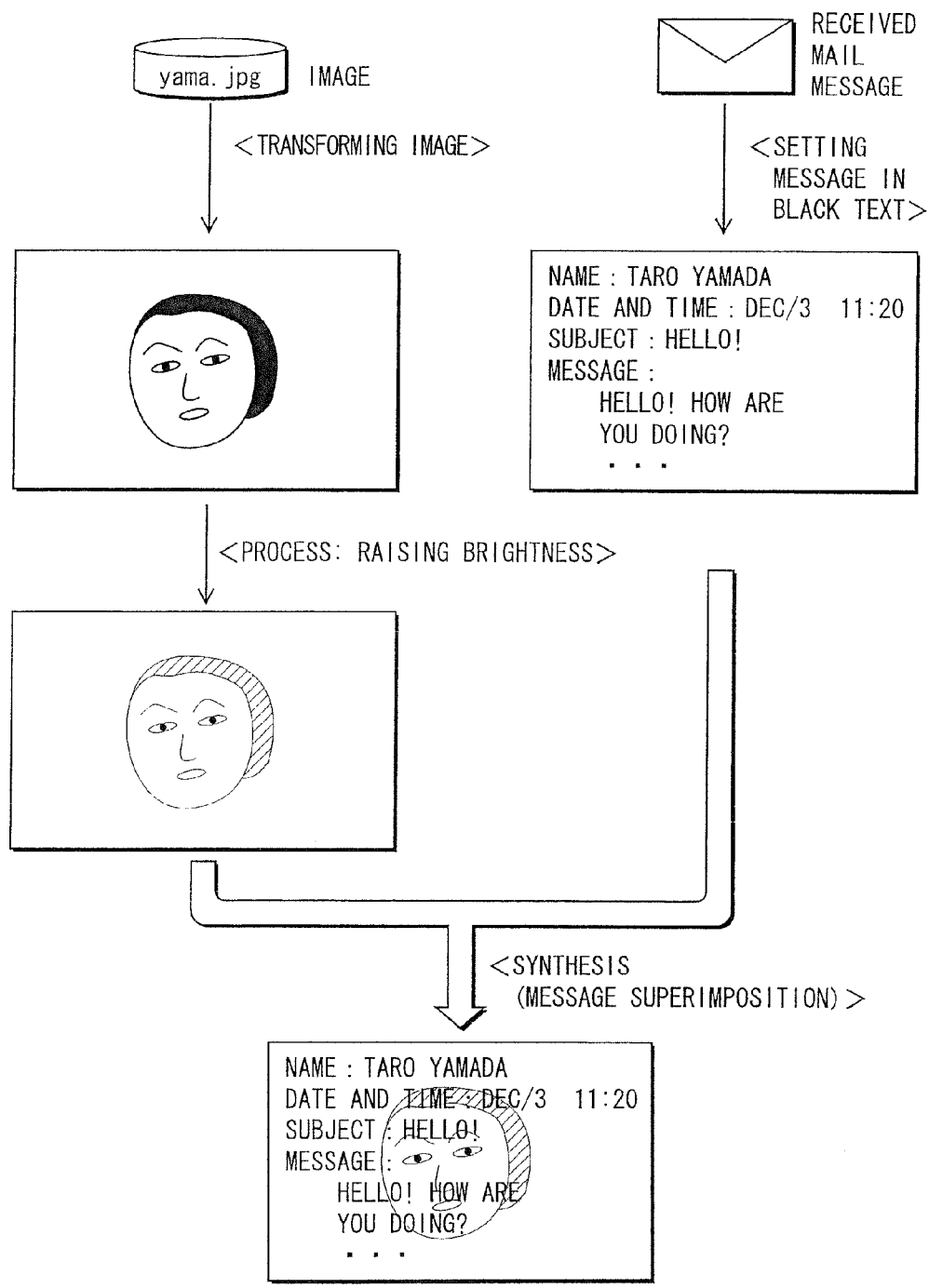
FIG. 9 shows an example of a process for synthesizing a mail message and a background image according to the preferred embodiment.

FIG. 9 shows a process performed by the received mail display control unit 140 for synthesizing a mail message and an image in the case when the image is also displayed at the time of display of the message.

The received mail display control unit 140 reads image data file of the image data ID information of the mail sender, who has been registered to the address book. The received mail display control unit 140 then performs image transform, in a temporary area of the RAM (Random Access Memory), on the image data file, using the image data file as an original image. According to the image transform, a brightness or a contrast value is assigned to each pixel of the image. Here, assume that each pixel is composed of three primary colors, R, G and B, each of which is represented in ten brightness scales from 0 to 10.

Next, the received mail display control unit 140 creates a background image by raising or lowering the color brightness of each pixel of the transformed image.

Figure 10A:
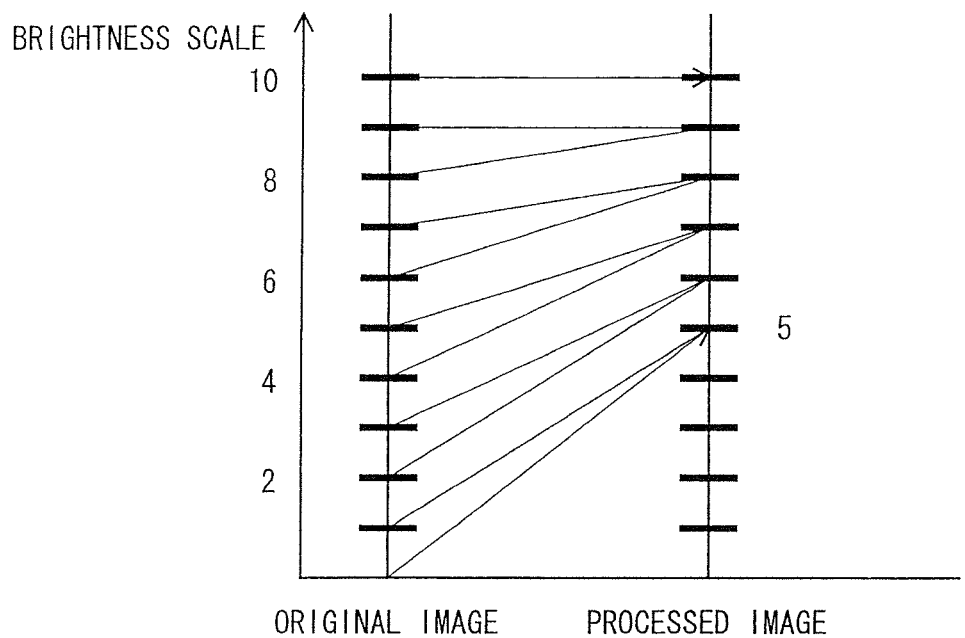
FIGS. 10A-B show examples of converting brightness of the background image according to the preferred embodiment.
Figure 10B:
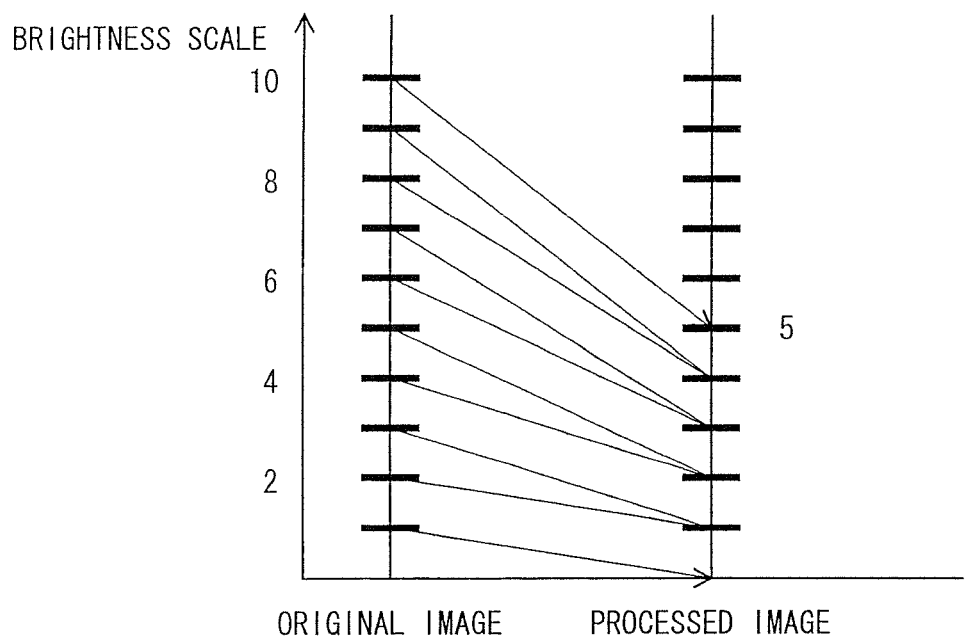

FIGS. 10A-B show how to raise and lower the brightness scales of each color of an original image.

How to raise the brightness is first described. As shown in FIG. 10A, when a brightness of a color of the original image is n, the brightness n is converted into a brightness in six scales from 5 to 10. For example, the brightness scale of 0 or 1 in the original image is converted into 5, while the brightness scale of 2 or 3 being converted into 6.

When the maximum brightness is m (m=10) and a brightness of one color in the original image is n, a brightness after conversion, c, is expressed by the following equation:

$$c=(m+n)/2 \qquad \text{(Eq. 1)}$$

Here, the decimal numbers will be rounded off

The received mail display control unit 140 synthesizes the mail message and the processed image with raised brightness. More specifically speaking, the received mail display control unit 140 uses the image as a background image, on top of which then the mail message in black text (the brightness of each color, R, G and B of pixels for the message letters is set to 0) is laid. Then, the received mail display control unit 140 displays the synthesized image.

In the case of lowering the brightness, if a brightness of a color of the original image is n, the brightness n is converted into a brightness in six scales from 0 to 5, as shown in FIG.

10B. For example, the brightness scale of 1 or 2 in the original image is converted into 1, while the brightness scale of 3 or 4 being converted into 2.

A brightness after conversion, c, is expressed by the following equation:

$$c=n/2 \quad (Eq. 2)$$

Here, the decimal numbers will be rounded off.

The received mail display control unit 140 synthesizes the processed image and the mail message by superimposing the message in white text (the brightness of each color, R, G and B of pixels for the message letters is set to 0) onto the image, and displays the synthesized image. Thus, either one of the above-mentioned synthesizing processes can be performed.

Figure 11:
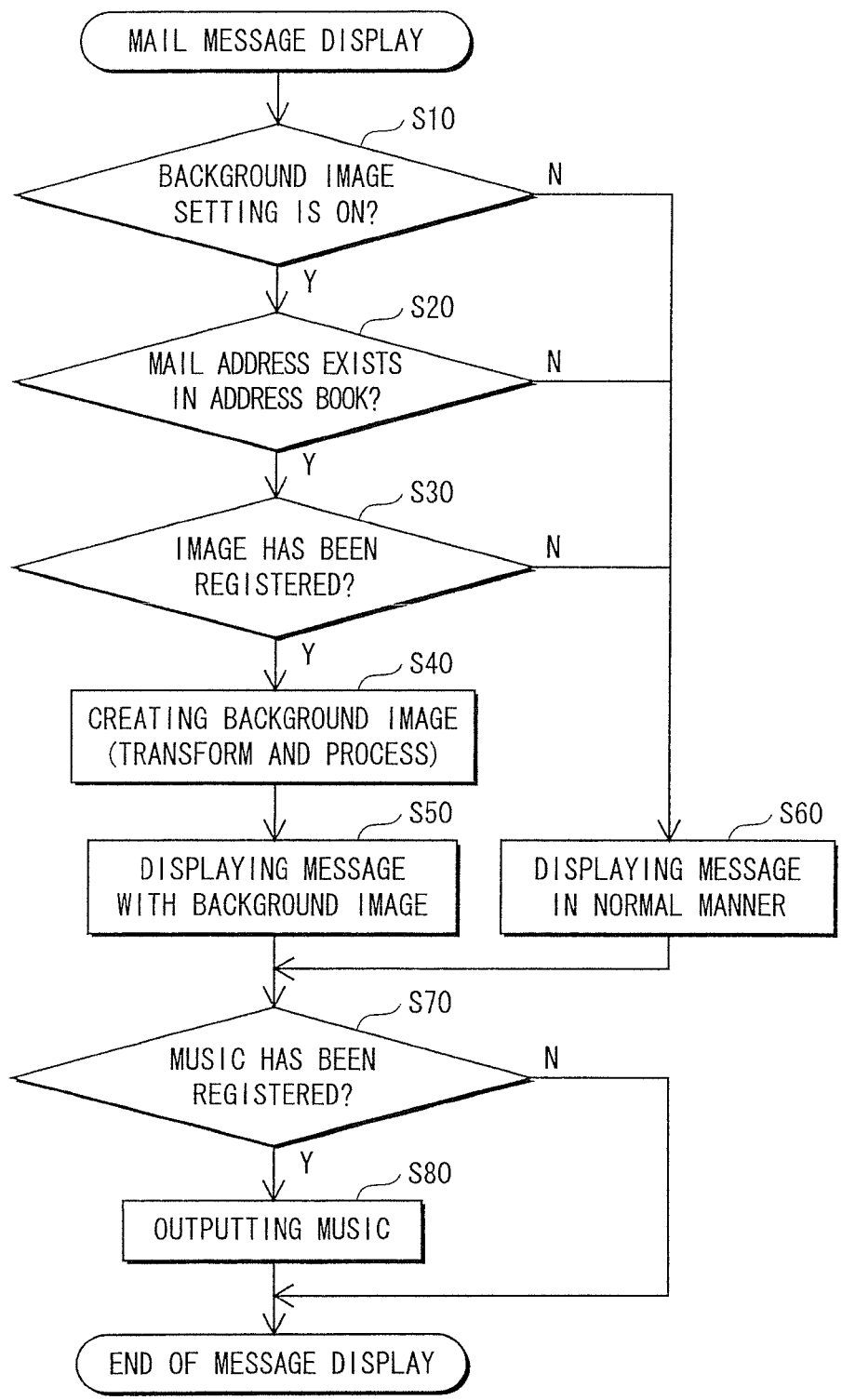
FIG. 11 is a flowchart showing a process for displaying the mail message according to the preferred embodiment.

FIG. 11 is a flowchart showing a process for displaying a mail message.

Next is described a process performed by the received mail display control unit 140 for displaying a mail message, with the aid of FIG. 11.

The received mail display control unit 140 displays sender name, receipt date and time, and subject of a received mail specified by the user, and then displays the mail message. Next, the received mail display control unit 140 refers to the mail management table 404 in the mailbox 401, and checks whether the flag of the background image for the reception/display settings is ON (Step S10). If the flag of the background image is not ON, the received mail display control unit 140 displays the message in the normal manner without displaying the background image (Step S60).

In the case of the flag of the background image being ON, the received mail display control unit 140 checks whether the mail address of the mail's sender has been registered to the address book 301 (Step S20). If it has not been registered, the received mail display control unit 140 displays the message in the normal manner (Step S60). When the sender's mail address has been registered, the received mail display control unit 140 further checks whether image data ID information of the sender's image associated with the mail address has been registered to the address book (Step S30). If it has not been registered, the received mail display control unit 140 displays the message in the normal manner (Step S60).

If the image data ID information has been registered, the received mail display control unit 140 reads image data file identified by the image data ID information from the image/music data files 304 of the information storage unit 100, performs image transform in a temporary area of the RAM, and converts the image into an image used as a background image by raising the brightness scales of individual R, G and B colors of each pixel with the use of (Eq. 1) (Step S40). The received mail display control unit 140 sets the color of the letters in the message text to black, superimposes the message in black text onto the background image, and displays this superimposed image (Step S50).

Next, the received mail display control unit 140 checks whether music data ID information associated with the mail address has been registered to the address book (Step S70). If it has been registered, the received mail display control unit 140 reads a music data file identified by the music data ID information from the image/music data files 304, and outputs the music via the audio processing unit 104 (Step S80).

Thus concludes the description of the display process of a mail message performed by the received mail display control unit 140.

In the above display process of the mail message, the image for the background is produced in Step S40 by raising the brightness scales of the original image, and the letters of the message text are displayed in black. Instead, the image for the background may be produced by lowering the brightness scales according to (Eq. 2) and the letters may be displayed in white.

In the preferred embodiment, the target of the above-described display process is received mails only. However, in order to output an image of the destination party and music, a similar procedure may be applied when the message of a sent mail 413 stored in the outbox is displayed, and further when the message of an outgoing mail in process of creation is displayed.

Although the brightness scales of the image range from 0 to 10 in the preferred embodiment, it is a matter of course that the present invention is not limited to these scales, and the brightness scales are changeable according to the image data and the performance of the display device. In addition, the brightness is described here as brightness of each of the three primary colors; as a matter of course, the present invention is not limited to these three primary colors. Displaying brightness of the pixels in gray scales is also within the scope of the present invention.

Figure 12:
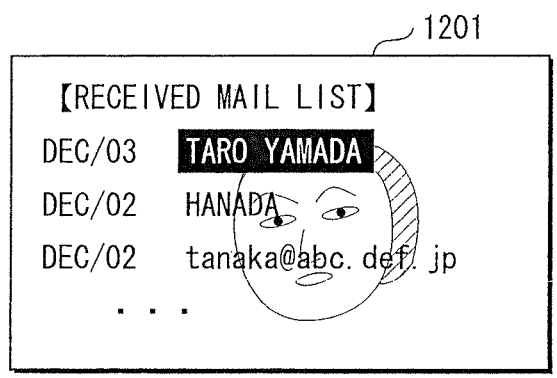
FIG. 12 is an example of a display of the background image in a received mail list according to a modified embodiment.

In the preferred embodiment above, if image data ID information associated with the mail address of the sender of the received mail has been registered to the address book 301, an image of the image data file which is identified by the image data ID information is displayed as a background image when the message of the received mail is displayed. In addition to this, or instead of this, if image data ID information associated with the mail address of the sender of the received mail 802, which is currently selected as shown in FIG. 8, has been registered to the address book, an image of the image data file identified by the image data ID information may be displayed as a background image of the received mail list 801 when the received mail list 801 is displayed. An example of this is a received mail list 1201 shown in FIG. 12. FIG. 12 illustrates a case where image data identified by image data ID information which has been registered in the sender information of a sender called "Yamada" is displayed as a background image.

The present invention may be a computer program that achieves the method by a computer, or may be a digital signal representing the computer program.

The present invention may also be achieved by a computer-readable recording medium, such as a semiconductor memory or the like, on which the above-mentioned computer program or digital signal is recorded.

The present invention may also be the computer program or digital signal to be transmitted via networks, as represented by telecommunications, wire/wireless communications, and the Internet.

INDUSTRIAL APPLICABILITY

The mobile communication device according to the present invention is applicable in telecommunications technology.

What is claimed is:
1. A mobile communication device comprising:
a storage unit configured to store therein image data;
an address book storage unit configured to store therein communication party information, which indicates a party for mail communication, the communication party information being associated with the image data; and
an output control unit configured to display, when a sent mail that is transmitted by the mobile communication device is selected by selection of transmission destination information that corresponds to the sent mail that is displayed, image data together with the transmission destination information, wherein the transmission destination information comprises communication party information pertaining to the sent mail, the image data being associated with the transmission destination information such that the image data is displayed together with the transmission destination information upon selection of the transmission destination information, and wherein the image data was previously stored in the storage unit and not attached to the sent mail when it was sent.

2. The mobile communication device of claim 1, wherein the output control unit comprises:
   an image synthesizing subunit configured to form a synthesized image by synthesizing the transmission destination information and the image data associated therewith; and
   a synthesized image display subunit configured to display the synthesized image.

3. The mobile communication device of claim 2, wherein:
   the image synthesizing subunit is further configured to form the synthesized image by synthesizing the associated image data and a message contained in the sent mail; and
   the synthesized image display subunit is further configured to display the synthesized image.

4. The mobile communication device of claim 3, wherein the image synthesizing subunit forms an image by performing, on the associated image data, brightness enhancement in which brightness of each pixel of the associated image data is brought close to maximum brightness, and forms the synthesized image by using the formed image as a background image, on top of which the message in black text is laid.

5. The mobile communication device of claim 4, wherein in the brightness enhancement, a brightness scale of each pixel of the associated image data is changed to a value calculated from $(m+n)/2$, where m is a maximum brightness scale and n is the brightness scale of the pixel.

6. The mobile communication device of claim 3, wherein the image synthesizing subunit forms an image by performing, on the associated image data, brightness reduction in which brightness of each pixel of the associated image data is brought close to minimum brightness, and forms the synthesized image by using the formed image as a background image, on top of which the message in white text is laid.

7. The mobile communication device of claim 2, wherein the communication party information includes a mail address of the communication party, and the output control unit displays the image data associated with the communication party information including the mail address together with the message of the specified mail.

8. The mobile communication device of claim 1, wherein the storage unit includes a music data storage subunit operable to store therein music data, the communication party information stored in the address book storage unit is associated with the music data, and the output control unit includes a music output subunit configured to output, when the message of the sent mail is displayed, the associated music data.

9. The mobile communication device of claim 1, wherein the output control unit comprises:
   an image synthesizing subunit configured to form a synthesized image for a mail list display by synthesizing a mail list and the associated image data when the sent mail is selected in the mail list; and
   a synthesized image display subunit configured to display the synthesized image.

10. A control method of a mobile communication device including a storage unit operable to store therein image data and an address book containing communication party information, which indicates a party for mail communication, the communication party information being associated with the image data, the control method comprising:
    when a sent mail that was previously transmitted by the mobile communication device is selected by selection of transmission destination information that corresponds to the sent mail, reading image data associated with the transmission destination information from the storage unit, the transmission destination information corresponding to communication party information contained in the address book; and
    displaying the read image data together with the transmission destination information, wherein the image data was not transmitted with the sent mail when the sent mail was previously transmitted.

11. The control method of claim 10, further comprising:
    forming a synthesized image by synthesizing the transmission destination information and the image data associated therewith; and
    displaying the synthesized image.

12. The control method of claim 11, wherein the synthesized image further includes a message contained in the sent mail, the message being synthesized with the transmission destination information and the image data.

13. The control method of claim 12, further comprising:
    performing, on the associated image data, brightness enhancement in which brightness of each pixel of the associated image data is brought close to maximum brightness; and
    forming the synthesized image by using the formed image as a background image, on top of which the message in black text is laid.

14. The control method of claim 13, wherein in the brightness enhancement, a brightness scale of each pixel of the associated image data is changed to a value calculated from $(m+n)/2$, where m is a maximum brightness scale and n is the brightness scale of the pixel.

15. The control method of claim 12, further comprising:
    performing, on the associated image data, brightness reduction in which brightness of each pixel of the associated image data is brought close to minimum brightness; and
    forming the synthesized image by using the formed image as a background image, on top of which the message in white text is laid.

16. The control method of claim 10, further comprising:
    storing music data associated with the communication party information; and
    outputting, when the transmission destination information of the sent mail is selected, the associated music data.

17. The control method of claim 10, further comprising:
    forming a synthesized image for a mail list display by synthesizing a mail list and the associated image data when the sent mail is selected in the mail list; and
    displaying the synthesized image.

18. The control method of claim 10, wherein the communication party information includes a mail address of the communication party, the method further comprising displaying the image data associated with the communication party information including the mail address together with the message of the sent mail.

* * * * *